March 5, 1963 N. BRODIE 3,079,871
AUTOMOTIVE SERVICE BUILDING

Filed June 6, 1960 3 Sheets-Sheet 1

INVENTOR
NATHAN BRODIE

BY *Allen M. Krass*

ATTORNEY

March 5, 1963    N. BRODIE    3,079,871
AUTOMOTIVE SERVICE BUILDING
Filed June 6, 1960    3 Sheets-Sheet 2
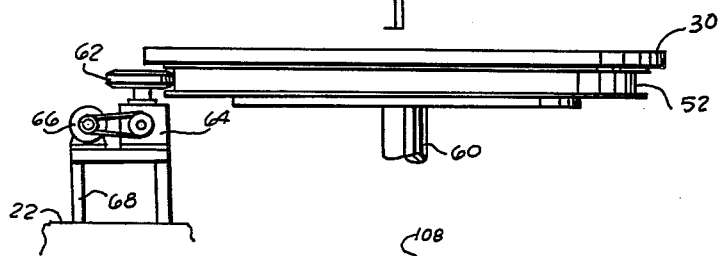
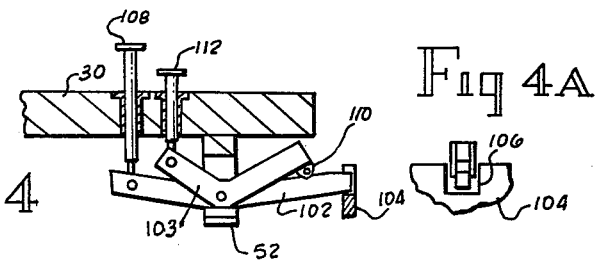
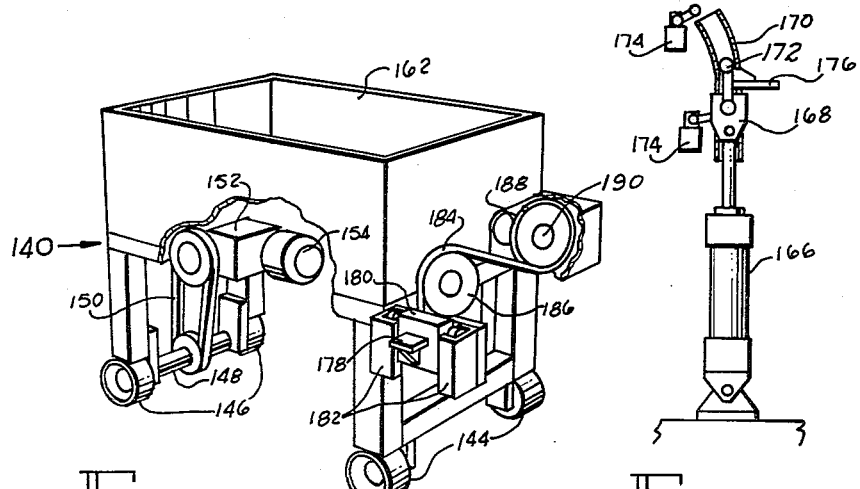
INVENTOR.
NATHAN BRODIE
BY
ATTY.

March 5, 1963 N. BRODIE 3,079,871
AUTOMOTIVE SERVICE BUILDING
Filed June 6, 1960 3 Sheets-Sheet 3
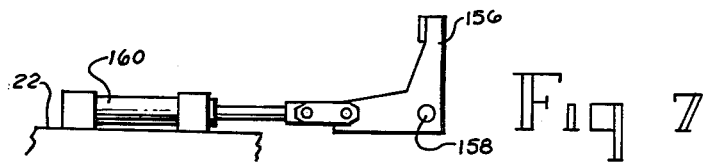
Fig 7
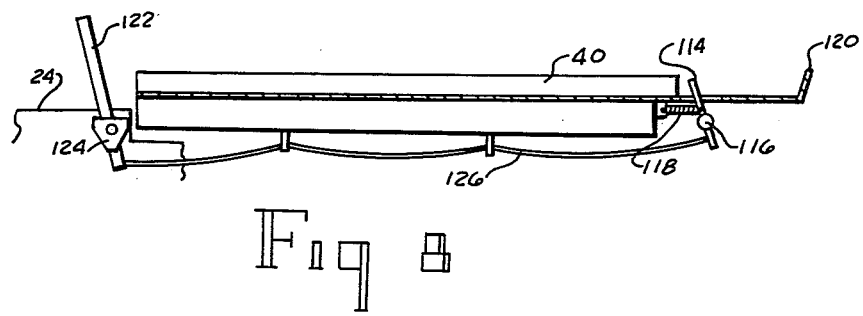
Fig 8
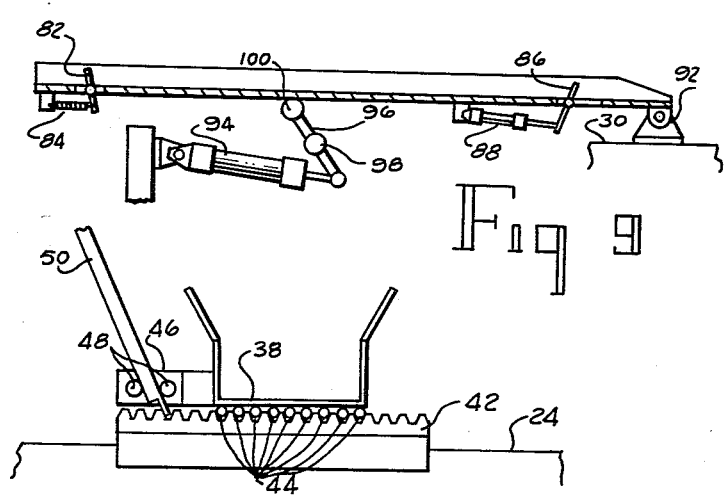
Fig 9
Fig 10
INVENTOR.
NATHAN BRODIE
BY Allen M Kross
ATTY

United States Patent Office 3,079,871
Patented Mar. 5, 1963

3,079,871
AUTOMOTIVE SERVICE BUILDING
Nathan Brodie, 2996 Orchard Place, Orchard Lake, Mich.
Filed June 6, 1960, Ser. No. 34,220
4 Claims. (Cl. 104—44)

This invention relates to a machine for use in servicing automotive vehicles, which machine may occupy an entire building or alternatively be disposed within a larger building as a section thereof.

The primary object of the present invention is to provide servicing arrangements for automotive vehicles, allowing unrestricted access to the undersides of the vehicles, which are adapted to service a maximum number of vehicles in a minimum time and in a minimum space.

The preferred embodiment of the invention is specifically arranged in such a manner as to allow personnel to remove and replace the exhaust systems of automobiles, such systems normally consisting of an exhaust pipe, which connects the engine of the vehicle to another unit of the system; a muffler; and a tail pipe, which connects the outlet of the muffler to the surrounding atmosphere. In the preferred embodiment, access is provided to this exhaust system through a structure which has two adjacent levels of elevation. The upper level of elevation broadly comprises an annular floor having a plurality of elongated apertures arranged radially about a central turntable. An automobile to be serviced is driven onto a support disposed on the turntable where the vehicle's wheels are locked against motion. The turntable is then rotated into alignment with one of the radially disposed servicing apertures and a pair of the vehicle's wheels are elevated so as to cause it to roll over the selected aperture where its wheels are again locked in place. A service operator disposed on the lower elevation beneath the selected aperture then has complete access to the vehicle's exhaust system. A second turntable disposed coaxially with the first is rotatable to bring the operator the necessary replacement material for the vehicle. A waste truck operates on the lower level in a circular path about the axis of the turntables and it may be halted at any service aperture in order to receive the waste parts. Means are provided for periodically dumping these waste products from the truck onto a conveyor which removes them from the servicing area.

After the necessary exhaust system components have been replaced, the upper level turntable is again rotated to bring its vehicle track in alignment with the aperture containing the subject vehicle. The vehicle is then driven onto the track which is then rotated to dispose the vehicle in a position facing the entrance to the area, from which it is driven out of the area.

It is, therefore, seen to be an object of the present invention to provide a machine for use in servicing automotive vehicles having a first raised elevation including a plurality of radially aligned service apertures disposed at regular intervals about a turntable indexable into operative alignment with any of the said apertures and having means thereon for receiving an automotive vehicle and powering it into position over any of said apertures; and a lower level adapted to support operators in working position under each of said apertures, and having means for delivering to such operators exhaust system parts and receiving from said operators used parts and delivering such used parts out of said servicing area.

A further object of the present invention is to provide in connection with said servicing apertures and turntable means for receiving automotive vehicles and locking such vehicles so as to prevent their independent motion and for transferring vehicles between the turntable and all of the apertures.

All of the above objects are achieved in a manner which is consonant with the primary object of providing means for servicing the undersides of a maximum number of automotive vehicles in a minimum area and with minimum labor.

These and other objects, advantages, and applications of the present invention will be made apparent by the following detailed description of a preferred embodiment of the invention. The description makes reference to the accompanying drawings in which:

FIGURE 3 represents a sectional elevation view illustrating the driving mechanism for the main turntable;

FIGURE 4 represents a detail sectional elevation view of the means for locking the turntable into alignment with a particular work station, and FIGURE 4A represents an end view of a portion of that mechanism;

FIGURE 5 represents a perspective view, cut away at points, of the waste receiving truck of the preferred embodiment;

FIGURE 6 represents a detail view of the mechanism for dumping the truck of FIGURE 5 so as to remove its contents;

FIGURE 7 represents a detail plan view of the means for stopping the dump truck of FIGURE 5 at particular points;

FIGURE 8 is a detail elevation view of the means for locking an automobile in any particular one of the service apertures;

FIGURE 9 is a detail elevation view of the lift disposed on the main turntable and used for receiving an automobile and powering it into one of the service areas; and FIGURE 10 represents a detail elevation view of the means for shifting the tracks adjacent to a service area so as to accommodate vehicles of different distance between wheels.

Figure 1:
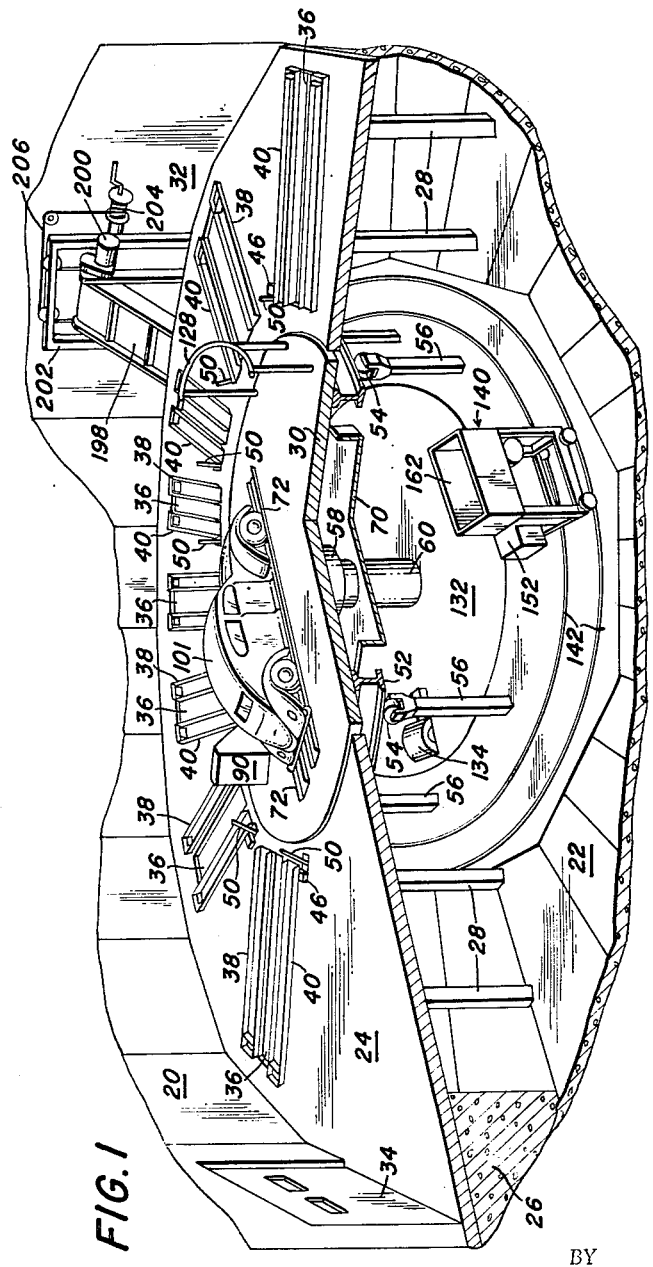
FIGURE 1 represents a perspective view of a building enclosing a preferred embodiment of the invention, such view being cut away at selected points.
Figure 2:
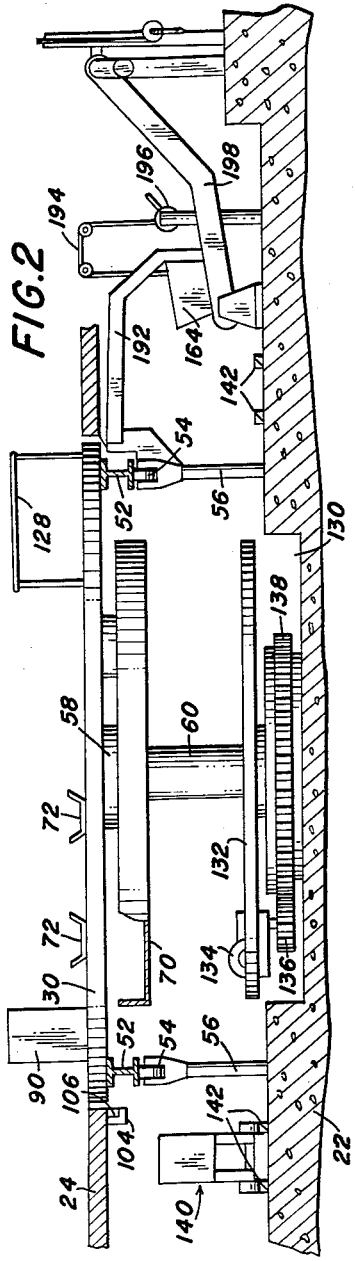
FIGURE 2 represents an elevation view of the preferred embodiment cut away at particular points.

The preferred embodiment of the invention is illustrated as being contained within a circular building 20 as may be seen in FIGURE 1. This is not an essential characteristic of the invention and it might also form a section of a building which included other areas.

The structure is generally formed at two levels. The lower level 22 is preferably constructed of cement or similar surfacing material and may form a portion of the foundation of the building 20. The upper level 24 may be formed of fabricated steel, reinforced concrete, or materials of that nature. The upper level 24 is generally circular in shape and is supported at its radially outer ends on a raised section of foundation 26. Radially inward of the foundation, it is supported on a plurality of vertical steel columns 28 arranged in a circular array and extending between the lower level 22 and the upper level 24. The upper level 24 is cantilevered radially inward of the columns 28 so that its edges form the perimeter of a large central aperture. This aperture is filled by a turntable 30 formed of structural steel and shown with a pie-section cutout in FIGURE 1.

The upper level 24 and the turntable 30 collectively cover the entire upper area of the building 20 with the exception of one bay section 32 which will be described subsequently. Access to this upper area is provided through a large overhead door 34. With the exception of the area intermediate the door 34 and the turntable 30, the upper level 24 is occupied by a plurality of service bays, each of which constitutes a rectangular aperture 36 disposed approximately radially at regular intervals with respect to one another and paralleled on their clockwise sides with a movable rail 38 and on their counterclockwise sides with a stationary rail 40. The rails are adapted to accommodate the tires of automobiles.

FIGURE 10 illustrates a cross-section through the shifter mechanism for the movable rails 38 which are manually adjusted to accommodate the wheel spacing of an automobile to be placed over a particular aperture. Each movable track is supported on a rack 42 fixed onto the upper level floor by a plurality of rods which are fixed to the lower side of the tracks and have a spacing similar to that of the teeth on the rack 42. A bracket 46 which is affixed to one side of the track 38 supports a pair of rollers 48 which are spaced a short distance from one another with their axes extending horizontally. A lever or shifter fork 50 is adapted to be manually inserted between the rollers 48 so that its lower end contacts a tooth of the rack 42. A rotational motion of the lever 50 then serves to shift the track 38 to the proper position for accommodating the next vehicle. The operator of the device performs the shifting operation whenever necessary.

The central turntable 30 carries a circular track 52 formed of bent I-beam section around its lower perimeter. This track 52 is supported on a plurality of circular rubber bearings 54 which are disposed in clevices supported on top of column members 56. The bearings and their supports are disposed at regular intervals in a circular pattern about the center of the turntable. The central turntable 30 rotates about a center bearing 58 which is supported above the lower level 22 in a large central column 60.

As may be seen in FIGURE 3, the turntable is rotated by a friction rim drive wheel 62 that rotates about a vertical axis and bears against the rail 52 which is affixed below the turntable 30. The wheel 62 is powered through a speed reducer 64 and an electric motor 66 which are connected by a belt and pulley drive. These units are supported above the lower floor 22 on a table 68. They are not illustrated in FIGURE 1. A circular sheet metal drip pan 70 is supported on the column 60 directly below the turntable 30 and serves to collect any lubricants which may drip from an automobile disposed on the central turntable.

Vehicles are accommodated on the turntable by a pair of track-type wheel guides 72, which are disposed parallel to one another off the center on the turntable. These wheel guides are wide enough to accept a wide range of tread widths and are, therefore, not adjustable. The apertures 36 and their tracks 38 and 40 are aligned about the upper level 24 with their tracks in line with the tracks 72 of the turntable when the turntable is disposed in the appropriate direction.

FIGURE 9 illustrates a detail view of a track 72 and its associated mechanism. A track mechanism includes a rear stop member 82, which is normally disposed in an upright position by a spring 84 and serves to lock the wheels of the car when in that position but which may be lowered against the spring pressure when the car is powered by its engine. A front stop 86 is pivoted into position by a hydraulic cylinder 88 which may be actuated by the operator of the device from a control console 90. Both tracks are supported above the turntable 30 on pivots 92. They may be lifted about their pivot point by a hydraulic cylinder 94 which actuates a lever arm 96 pivoted about a fixed point 98. A roller 100 on the outward end of the lever arm presses against both the tracks and acts to lift them about the pivot point 92. If the stop 86 has been retracted by the cylinder 88, the automotive vehicle 102 may then roll forward into position over one of the apertures 36.

The system for indexing the turntable 30 to a particular aperture is illustrated in detail in FIGURE 4. A pair of levers 102 and 103 are both pivoted about the same axis in an aperture in the rail 52. The lever 102 is the longer of the two and at its outward end it contacts a rail 104 which is fixed to the lower side of the upper level floor 24 adjacent to the rail 52. The stationary rail 104 contains grooves 106 cut at its top edge at regular intervals, which grooves are adapted to retain the outer end of the lever 102 in a locked position when the turntable 30 is disposed in the proper position adjacent to a particular aperture.

The lever 102 may be lifted out of a groove 106 by a foot lever 108 which is manually actuated by the operator when he presses the button on the control console 90 that starts the turntable in rotation. At this point the lever 102 is gripped by a magnet 110 which is fixed to the outer end of the second lever 103. The magnet holds the free end of the lever 102 in an upright position so that it does not fall into the grooves 106. A second foot pedal 112 which is fixed to the other end of the lever 103 may be pressed by the operator when the table is approaching the aperture that he desires to stop at. This lifts the free end of the lever 103 and the magnet 110 which is affixed thereto, and breaks it away from the lever 102 which has a limited degree of motion. The lever 102 then rides on top of the rail 104 until it falls into the next groove 106 and thereby locks the turntable 30 into position with respect to the adjacent aperture. Then, the tracks 72 may be pivoted about the point 92 and the automobile 102 rolled into the aperture.

A stop mechanism illustrated in FIGURE 8 locks the vehicle 102 into position in the aperture. The lock works in the stationary rail 40 and it comprises a lever 114, which pivots about a fixed point 116, and which protrudes through an aperture near the forward end of the rail 40. A spring 118 normally maintains the lever 114 in an upright position so that a front automotive wheel may be trapped between it and the upwardly bent end 120 of the rail 40. The lock lever 114 may be lowered to allow an automobile to enter or leave the stall by means of a pivotable hand lever 122 which is disposed at the radially inward end of the track. This lever pivots about a fixed point 124 and its lower end connects to the lower end of the lever 114 by means of a cable 126. When the lever 122 is rotated so as to pull the lever 114 against the pressure of the spring 118, it lowers to the rail and a vehicle may be introduced into or removed from the aperture.

The upper level assembly is completed by a rail 128 which is disposed about the edges of the turntable 30 to protect the operator of a vehicle who may leave it after it is disposed on the turntable.

A central depression 130 occurs in the lower level floor 22 centrally below the turntable 30. A parts turntable 132 which is also journalled about the column 60 is rotatably supported just above this depression. The parts turntable is powered by an electric motor 134 fixed in its surface near the perimeter. The motor 134 carries a pinion gear 136 which extends below the turntable 132 and contacts a bull gear 138 fixed below the turntable 132 centrally about the column 60. Thus the rotation of the motor 134 causes the turntable 132 to rotate under the control of the operator.

New exhaust system parts are manually loaded onto the table 132 at a particular point about its perimeter and the table is then rotated to bring the part to the operator who needs it. Alternatively a plurality of different parts may be disposed on the turntable and the operator of any particular aperture may cause it to rotate until the parts that he desires are located adjacent to his position.

The service man who removes the defective exhaust system parts from the vehicle loads them into a trash truck 140 which operates about a circular rail 142 disposed in the lower level floor. As may be seen in FIGURE 5, the truck has a pair of freely rotating front wheels 144 and a pair of rear wheels 146 which are journalled on an axle 148. The axle may be rotated through a belt 150 which couples it to a speed reducer 152 and an electric motor 154. The controls (not shown) which power the electric motor may be stationed at convenient points below each service aperture.

The operator arranges for a truck to stop adjacent to his station by actuating a simple stop mechanism illustrated in FIGURE 7. The mechanism comprises a right-angle stop lever 156 which is pivoted about a pin 158 and powered by a pneumatic cylinder 160. When the rod of the cylinder 160 is retracted, the stop lever 156 extends over the outer rail 142 and halts the motion of the truck. When the cylinder rod is extended, the truck is free to continue its rotation.

The trash is supported in a bin 162 on top of the truck body. The bin 162 is pivoted about its inner, lower edge in order to dump the trash into a receptacle 164 that is fixed to a removable conveyor which will be subsequently described. This pivoting is performed by a dumper cylinder 166 adjacent to the receptacle 164. The cylinder 166 may be energized manually or automatically by means (not shown) disposed so as to be tripped when the truck body is adjacent to the receptacle 164. The rod of the cylinder 166 carries a slide 168 which moves along a track 170 by means of a roller 172 guided in the track. The limits of motion of the cylinder are adjusted by a pair of limit switches 174 stationed on the upper and lower extremes of travel of slide 168. An abutment 176 is fixed to the slide 168 and projects outwardly therefrom over the outer rails 142. When the truck 140 is in proper position with respect to the dumper cylinder 166 and the receptacle 164, and the cylinder 166 has its rod extended to the point limited by the upper limit switch 174, the abutment 176 is disposed over the mating abutment 178 which projects from a slide 180.

The slide 180 is fixed in a pair of rails 182 on the side of the dump truck 140. It is attached to the end of the cable 184 which passes over a pulley 186 and attaches to a second pulley 188. The pulley 188 is affixed to a shaft 190 about which the bin 162 pivots. Therefore, when the cylinder 166 retracts its rod and brings the abutment 176 down on the abutment 178, the slide 180 moves downwardly and rotates the pulley 188 by means of the cable 184 and thereby dumps the contents of the bin 162 into receptacle 164.

The receptacle 164 is pivotable about an arm 192 affixed to the stationary structure through one of the columns 56. It may be pivoted about this arm 192 by means of a cable 194 which connects to a hand operated winch 196. This dumping action feeds its contents to a conveyor 198. The conveyor is powered by an electric motor 200 disposed adjacent to its upper end. This upper end is disposed in the bay 32 in the side wall of the building 20. The conveyor extends between the wall of the bay and the adjacent outward edge of the upper level surface 24. A window 202 is disposed in the wall of the building at this point. The level of the upper end of the conveyor 198 is adjusted by another hand winch 204 which operates through a cable 206 in order to locate a proper position for dumping waste material into a vehicle stationed outside of the building.

To summarize the operation of the device, an automotive vehicle 102 is driven into the building 20 through a door 34. It then proceeds over the upper level service area 24 onto a pair of spaced tracks 72 on the turntable 30. The operator through use of the levers 108 and 112 then causes the turntable to index to a position for a car to be rolled over one of the perimeter apertures 36. This is done by the cylinder 94 lifting the rear end of the rail 72 so as to roll the car forward. At the same time, an operator lowers the lock lever 114 through use of the handle 122.

When the vehicle is in the proper position over the aperture the operator releases the lever 122 and locks the car into position. The operator then rotates the lower turntable 132 until the parts he desires are adjacent to him. He places the defective parts into a bin 162 on a truck 140 which he locates adjacent to his position through use of a stop 156. When the service on the vehicle is completed, the turntable is again rotated to bring the rails 72 into position to receive it and the car is driven off the rails 38 and 40 onto the turntable rails 72. The turntable is then again rotated to direct the forward end of the car toward the door 34 and the vehicle is driven from the building 30.

The contents of the truck 140 are emptied into a receptacle 164 by means of the dumper cylinder 166. The receptacle 164 is hand dumped onto the conveyor 198 which removes it from the building at the proper time.

Having thus described my invention, I claim:

1. An automotive service area comprising: a lower level; an upper level supported above said lower level; a circular aperture disposed centrally within said upper level; a plurality of elongated rectangular apertures arranged at approximately regular intervals about said upper level generally radially with respect to said central aperture, said rectangular apertures providing direct access to said lower level; a circular turntable disposed within said central aperture adapted to rotate about a vertical axis; means for indexing said turntable to any one of a number of predetermined rotational positions; means on said turntable for receiving an automotive vehicle and locking it into position; and means associated with each of said rectangular apertures for receiving an automotive vehicle and locking it into position with its wheels straddling said aperture.

2. An automotive service area comprising: a lower level; an upper level supported above said lower level; a circular aperture disposed centrally within said upper level; a plurality of elongated rectangular apertures arranged at approximately regular intervals about said upper level generally radially with respect to said central aperture, said rectangular apertures providing direct access to said lower level; a circular turntable disposed within said central aperture adapted to rotate about a vertical axis; means for indexing said turntable to any one of a number of predetermined rotational positions; means on said turntable for receiving an automotive vehicle and locking it into position; means associated with each of said rectangular apertures for receiving an automotive vehicle and locking it into position with its wheels straddling said aperture; and means for elevating one pair of wheels of the vehicle when it is disposed on said turntable so as to cause it to roll onto said second level.

3. An automotive service device comprising in combination: a lower level; an upper level; a central circular aperture in said upper level; a plurality of elongated apertures disposed with their axes aligned radially with the center of said circular aperture disposed at regular intervals about said upper level and communicating with the lower level; a vertical column rising above said lower level with its axis disposed on the center line of said circular aperture; a circular turntable rotatably supported on said column and having its surface in horizontal alignment with said upper level; means on said turntable for receiving an automotive vehicle and locking it against independent motion; and means for indexing said turntable to a number of discrete rotational positions.

4. An automotive service device comprising in combination: a lower level; an upper level; a central circular aperture in said upper level; a plurality of elongated apertures disposed with their axes aligned radially with the center of said circular aperture disposed at regular intervals about said upper level and communicating with the lower level; a vertical column rising above said lower level with its axis disposed on the center line of said circular aperture; a circular turntable rotatably supported on said column and having its surface in horizontal alignment with said upper level; means on said turntable for receiving an automotive vehicle and locking it against independent motion; means for indexing said turntable to a number of discrete rotational positions; and means for powering a vehicle from said turntable to a position straddling one of said elongated apertures.

References Cited in the file of this patent

UNITED STATES PATENTS

| | | |
|---|---|---|
| 1,552,326 | Lunati | Sept. 1, 1925 |
| 1,797,830 | Koehler | Mar. 24, 1931 |
| 1,813,460 | Mugler | July 7, 1931 |
| 2,127,690 | Jones | Aug. 23, 1938 |
| 2,677,859 | McNew | May 11, 1954 |